(12) United States Patent
Kato

(10) Patent No.: US 6,618,160 B1
(45) Date of Patent: Sep. 9, 2003

(54) FACSIMILE APPARATUS

(75) Inventor: Tokunori Kato, Ichinomiya (JP)

(73) Assignee: Brother Kogko Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/174,089

(22) Filed: Oct. 16, 1998

(30) Foreign Application Priority Data

Nov. 29, 1997 (JP) .............................................. 9-343806

(51) Int. Cl.⁷ ................................................. H04N 1/32
(52) U.S. Cl. ..................... 358/1.14; 358/1.15; 358/468; 358/437; 709/206
(58) Field of Search ............................. 358/1.14, 1.15, 358/437, 447, 440, 468; 709/207, 206

(56) References Cited

U.S. PATENT DOCUMENTS

| | | | | |
|---|---|---|---|---|
| 5,293,253 A | * | 3/1994 | Kida et al. ................... | 358/440 |
| 5,307,178 A | * | 4/1994 | Yoneda ....................... | 358/440 |
| 5,406,387 A | * | 4/1995 | Yamamoto ................... | 358/407 |
| 5,579,088 A | * | 11/1996 | Ko ............................. | 358/203 |
| 5,619,648 A | * | 4/1997 | Canale et al. ............. | 395/200.01 |
| 5,862,325 A | * | 1/1999 | Reed et al. ............... | 395/200.31 |
| 5,881,233 A | * | 3/1999 | Toyoda et al. ............. | 358/440 |
| 5,978,837 A | * | 11/1999 | Foladare et al. ........... | 709/207 |
| 5,999,967 A | * | 12/1999 | Sundsted .................... | 709/206 |
| 6,172,763 B1 | * | 1/2001 | Toyoda et al. ............. | 358/1.15 |
| 6,199,102 B1 | * | 3/2001 | Cobb ......................... | 709/206 |
| 6,259,533 B1 | * | 7/2001 | Toyoda et al. ............. | 358/1.15 |

FOREIGN PATENT DOCUMENTS

| | | | |
|---|---|---|---|
| JP | 64-77277 | 3/1989 | ........... H04N/1/32 |
| JP | 1-172773 | 12/1989 | ........... H04N/1/32 |
| JP | 7-303162 | 11/1995 | ........... H04N/1/00 |
| JP | 8-18689 | 1/1996 | .......... H04N/1/387 |
| JP | 9-18629 | 1/1997 | .......... H04N/1/100 |
| JP | 9-93414 | 4/1997 | ........... H04N/1/32 |
| JP | 9-247336 | 9/1997 | .......... H04N/1/100 |

* cited by examiner

*Primary Examiner*—Thomas D. Lee
(74) *Attorney, Agent, or Firm*—Oliff & Berridge, PLC.

(57) ABSTRACT

A facsimile apparatus capable of automatically preventing image data transmitted from a specific sender is provided. When a polling time comes which is set to access a mail server in order to fetch an e-mail, a CPU of the facsimile apparatus accesses the mail server. After detecting the connection to the mail server, the CPU receives an e-mail from the mail server. The CPU then analyzes the character codes contained at the position of the sender name in the e-mail. If it is determined that a predetermined character code is contained, the CPU performs the reverse format conversion of the image data attached to the e-mail, expands the image data, and outputs an instruction to print the image data.

17 Claims, 8 Drawing Sheets

HEADER
```
Content-Type:image/tiff
Subject:test
```

RECEIVER
```
To:<Kato@nnn.co.jp>
```

SENDER
```
From :" Suzuki@mmm.co.jp"
```

FACSIMILE APPARATUS

BACKGROUND OF THE INVENTION

1. Field of Invention

The invention relates to a facsimile apparatus capable of selectively printing only image information transmitted from a specific sender.

2. Description of Related Art

Conventional facsimile apparatuses print out all the image information received. Therefore, if a user does not desire to have the received image information printed out, any printed sheet would be wasteful.

SUMMARY OF THE INVENTION

Accordingly, the invention provides a facsimile apparatus capable of selectively printing only image information that a user desires to be printed.

According to one aspect of the invention, there is provided a facsimile apparatus including a reception device that receives image information and related information from an external communication device via a communication line, the related information including sender information that indicates a sender of the image information, a print device that prints at least the image information of the image information and the related information received by the reception device, onto a print medium. The facsimile apparatus further includes a determination device that determines whether the related information received by the reception device includes predetermined information, and a print prevention device that prevents printing from being performed by the print device if the determination device determines that the related information received by the reception device includes the predetermined information.

In this facsimile apparatus, the determination device determines whether the predetermined information is included in the related information, including the sender information indicating the sender, the related information received together with the image information from an external communication apparatus via the communication line and the reception device. If the determination device determines t the related information received by the reception device includes the predetermined information, the print prevention device prevents printing from being performed by the print device, which is designed to print at least the image information received by the reception device, onto a print medium.

That is, if printing of the image information transmitted from a certain sender is not desired, the printing of the image information from the sender can be prevented by pre-setting information that is assumed to be inevitably contained in the related information transmitted from the sender together with the image information, as the aforementioned predetermined information.

According to another aspect of the invention, there is provided a facsimile apparatus including a reception device that receives image information and related information from an external communication device via a communication line, the related information including sender information that indicates a sender of the image information, a print device that prints at least the image information of the image information and the related information received by the reception device, onto a print medium, and a determination device that determines whether the related information received by the reception device includes predetermined information. The facsimile apparatus further includes a print execution device that executes printing by the print device if the determination device determines that the related information received by the reception device includes the predetermined information.

In the facsimile apparatus according to the second aspect of the invention, the determination device determines whether the predetermined information is included in the related information, including the sender information indicating the sender, received together with the image information from the external communication apparatus via the communication line and the reception device. If the determination device determines that the related information received by the reception device includes the predetermined information, the print execution device executes printing by the print device, which is designed to print at least the image information onto a print medium.

That is, if the image information transmitted from a certain sender is desired to be printed, the printing of the image information from the sender can be executed by presetting information that is assumed to be inevitably contained in the related information transmitted from the sender together with the image information, as the aforementioned predetermined information.

The facsimile apparatus according to either one of the two aspects of the invention may further include the following. The predetermined information is predetermined sender information included in the related information, and the determination device determines whether the related information received by the reception device includes the predetermined sender information.

Therefore, if the determination device determines that the predetermined sender information is included in the related information, the printing of the image information by the print device is prevented or executed in the facsimile apparatus according to the first or second aspect of the invention.

For example, if a sender name "Suzuki" is designated beforehand as the predetermined sender information, reception of the related information containing "Suzuki" as the sender name, that is, the sender information, results in prevention of the printing of the image information received together with the related information, according to the first aspect of the invention. If the related information does not contain the sender information "Suzuki" as the sender name, the printing of the image information is executed. According to the second aspect, the printing is controlled in an opposite manner such that if the related information contains the sender information "Suzuki", printing is performed.

The facsimile apparatus of the invention may further include the following. The related information includes transmission purpose information that indicates a purpose of transmission of the image information. The predetermined information is the transmission purpose information, and the determination device determines whether the related information received by the reception device includes the predetermined transmission purpose information.

Therefore, if the determination device determines that the predetermined transmission purpose information is contained in the related information, the printing of the image information by the print device is prevented or executed according to the first or second aspect of the invention.

For example, if "test" is designated beforehand as the predetermined transmission purpose information, reception of the transmission purpose information "test" as a type of the subject, results in prevention of the printing of the received image information, according to the first aspect of the invention. If the related information does not contain the transmission purpose information "test" as a type of the subject, the printing of the image information is executed. According to the second aspect, the printing is controlled in an opposite manner such that if the related information contains the transmission purpose information "test", printing is performed.

The facsimile apparatus of the invention may further include the following. The related information includes text data formed by a plurality of character codes, and the determination device determines whether the related information received by the reception device includes the predetermined information, by determining whether a predetermined character code is present in the text data.

If the related information is text data formed by character codes, it becomes possible to detect the predetermined information by sequentially reading the character codes and compare them with a predetermined character code string. On the basis of the result of the detection, the printing of the image information is prevented according to the first aspect, and it is executed according to the second aspect.

The facsimile apparatus of the invention may further include the following. The image information is in an image file format and attached to an e-mail, and the reception device is capable of receiving the image information and the related information via the Internet.

If a conventional facsimile apparatus capable of receiving an image file attached to an e-mail receives a plurality of e-mail, the conventional facsimile apparatus prints out all of the received e-mail, even if only particular e-mail are actually desired to be printed. However, according to the invention, it becomes possible to selectively print only desired e-mails.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Preferred embodiments of the facsimile apparatus of present invention will be described in detail hereinafter with reference to the accompanying drawings.

The description below will be made in conjunction with a multi-function facsimile apparatus equipped with a facsimile function and other various functions, such as an e-mail function, an image scanner function, a printer function, a copier function, and the like.

Figure 1:
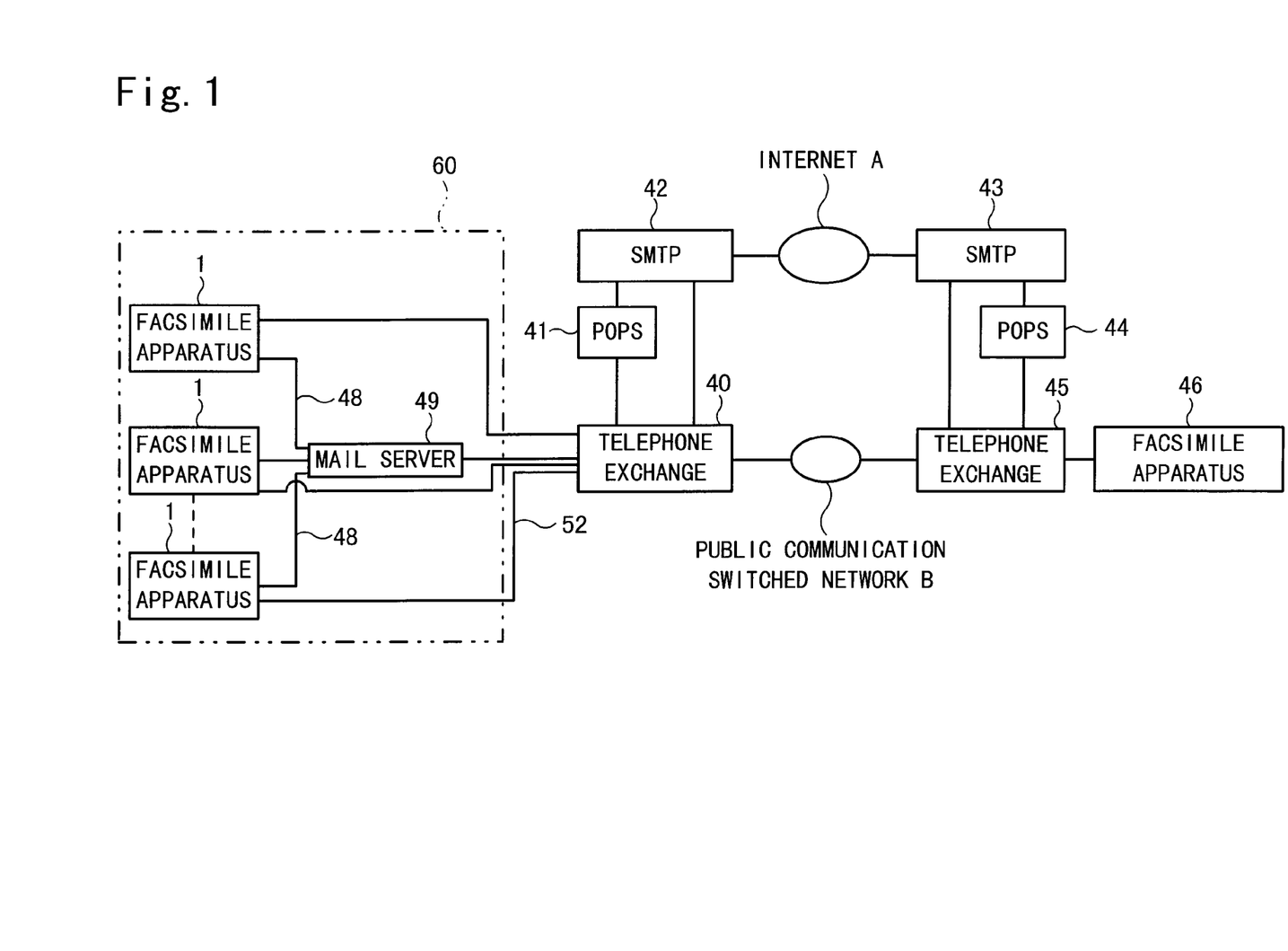
FIG. 1 is a block diagram illustrating the communication lines to which a facsimile apparatus according to a first preferred embodiment of the invention, is connected.

The construction of a communication line to which the facsimile apparatus of a first preferred embodiment is connected will be described with reference to the block diagram of FIG. 1.

Facsimile apparatuses 1 installed in various locations or functions in a company 60 are connected by LAN lines 48 to a mail server 49 that is connected to a telephone exchange 40 by a telephone line 52. Each facsimile apparatus 1 is also connected directly to the telephone exchange 40 by a telephone line 52.

The telephone exchange 40 is connected to the Internet A via a post office protocol server (POPS) 41 and a simple mail transfer protocol server (SMTP) 42. The Internet A is connected to an SMTP 43 that is connected to a facsimile apparatus 46 on a sender side, via a POPS 44 and a telephone exchange 45. The telephone exchange 40 and the telephone exchange 45 are interconnected also by a public communication switched network B.

The facsimile apparatus 46 on the sender side is capable of transmitting and receiving data through the internet A or the public communication switched network B. The facsimile apparatus 46 is an external communication device capable of communications with each facsimile apparatus 1.

Figure 2:
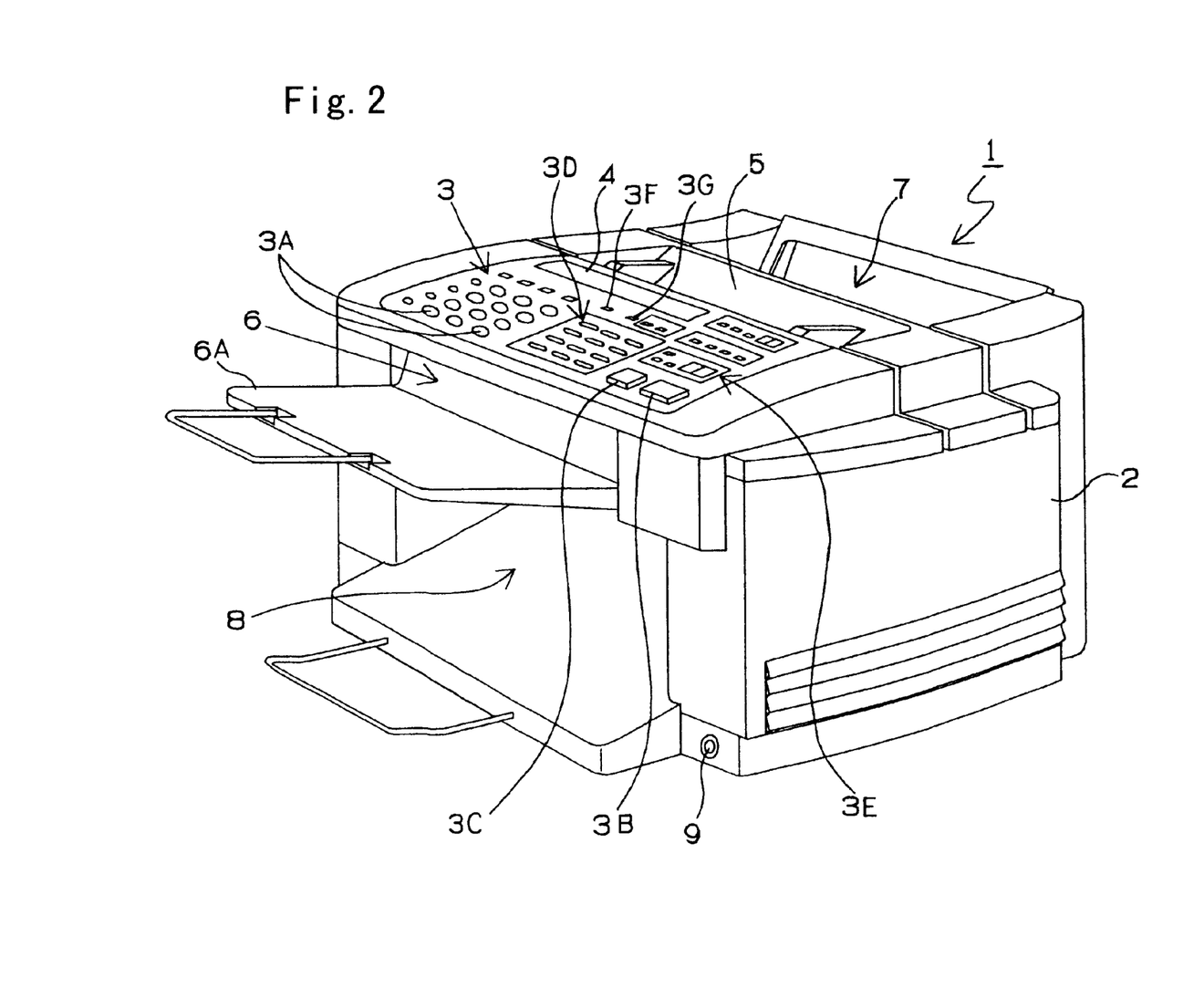
FIG. 2 shows the facsimile apparatus according to the preferred embodiment of the invention.

The construction of the facsimile apparatus I will be described with reference to FIG. 2, which shows an external appearance of the facsimile apparatus 1.

The facsimile apparatus 1 has a box-shaped housing 2. An operating panel 3 is provided in an upper front portion of the housing 2. The operating panel 3 has input keys 3a for inputting the name, the facsimile number or the mail address of a receiver, and the like. The input keys 3a are also used to input the name of a sender the image data from which will be prevented from being printed, or the name of a sender the image data from which will be printed. The operating panel 3 further has a start button 3b for inputting an image-data transmission start instruction or the like, a stop button 3c for inputting an image-data transmission stop instruction, speedcall buttons 3d for transmission of image data by using speed-call numbers or abbreviated numbers, and change buttons 3e for changing between a facsimile mode and a printer mode.

The operating panel 3 further has a setting button 3f for setting a print preventing mode for preventing the printing of image information from a sender, and for setting a print executing mode for a sender the transmission from which will be printed out. Further, a setting cancel button 3g is provided in the operating panel 3 for canceling the mode setting established by the setting button 3f.

Figure 3:
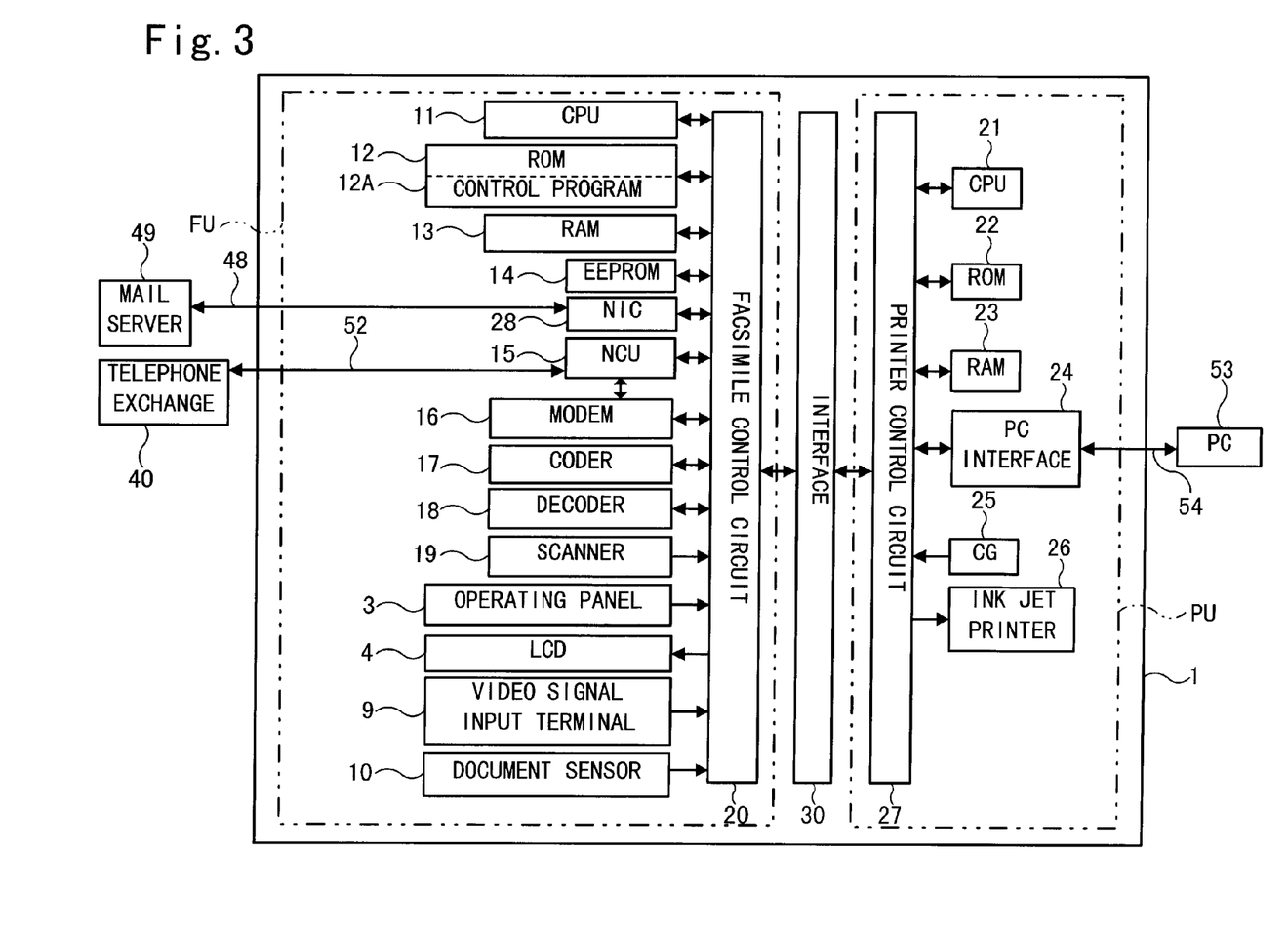
FIG. 3 is a block diagram of the facsimile apparatus shown in FIG. 2.

Disposed rearward of the operating panel 3 is a liquid crystal display (LCD) 4 for displaying the characters input by using the input keys 3a, the mail address or facsimile number of a receiver input using the input keys 3a, transmission status, and the like. Provided rearward of the LCD 4 is a document setting portion 5 for setting a document to be transmitted or copied. A document sheet is conveyed from the document setting portion 5 into the interior of the housing 2 by a sheet feeder mechanism (not shown) that is provided inside the housing 2, and image information is read from the document by an image scanner 19 (FIG. 3). After image information is read, the document is discharged onto a tray 6a through a document discharge opening 6 formed below the operating panel 3. A plurality of document sheets can be stacked on the tray 6a.

Formed rearward of the document setting portion 5 is a print sheet setting portion 7 for setting print sheets (recording medium sheets) on which received image data or print data will be recorded. The print sheet setting portion 7 receives therein a detachable sheet cassette (not shown) capable of containing a stack of print sheets. From the sheet cassette set into the print sheet setting portion 7, a print sheet is conveyed into the housing 2 by the sheet feeder mechanism, and then subjected to inkjet printing by an inkjet printer 26 (FIG. 3). After printing, the sheet is discharged out through a print sheet discharge portion 8 that is formed below the tray 6a.

A video signal input terminal 9 is provided in a front lower right portion of the housing 2. When a video camera or the like is connected to the video signal input terminal 9, video signals therefrom are taken in by the facsimile apparatus 1, and then printed out by the inkjet printer.

Although not shown, a back surface of the housing 2 is provided with a communication terminal for connection to the telephone line 52, a LAN connection terminal for connection to the LAN line 48, and a terminal for connection to a connecting cable 54 (FIG. 3) to a personal computer (hereinafter, referred to as "PC") 53 (FIG. 3). A handset for telephone usage or the like is provided on the left side of the housing 2.

The image data corresponds to image information according to the invention. The ink jet printer 26 constitutes a print device.

A main structural arrangement of the facsimile apparatus I will be described with reference to the block diagram of FIG. 3.

The facsimile apparatus 1 is equipped with a facsimile unit FU and a printer unit PU. The two units are interconnected by an interface 30. The facsimile unit FU has a CPU 11 that executes a control of transmission and reception of image data, and a control of executing or preventing the printing of received image data, and the like. The CPU 11 is connected to a facsimile control circuit 20. Furthermore, a ROM 12, a RAM 13 and an EEPROM 14 are also connected to the facsimile control circuit 20. The ROM 12 stores control programs 12a for the CPU 11 to execute various controls. The RAM 13 temporarily stores facsimile numbers and mail addresses input by operating the input keys 3a, image data read from a document by the image scanner 19, and the like.

Figure 4A:
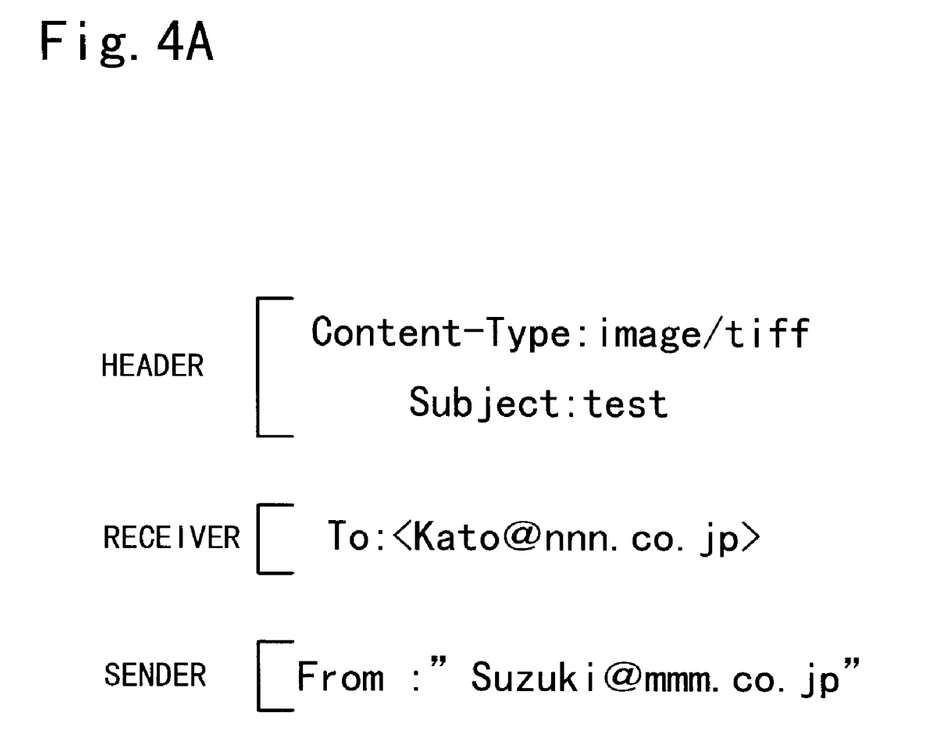
FIG. 4A illustrates the header, receiver information and sender information of an e-mail transmitted from an external apparatus.
Figure 4B:
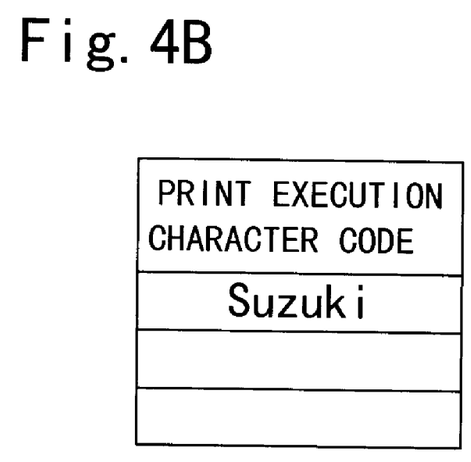
FIG. 4B illustrates a print execution character code stored in an EEPROM provided in the facsimile apparatus.

The content stored in the EEPROM 14 will be described with reference to FIGS. 4A, 4B and 4C. FIG. 4A illustrates the header, the receiver information, the sender information of an e-mail transmitted from the facsimile apparatus 46 on the sender side. FIG. 4B illustrates a portion of the content stored in the EEPROM 14.

The method of conversion into a character code and the header format are based on normal internet e-mail standards generally termed multipurpose internet mail extensions (MIME).

As shown in FIG. 4A, "Content-Type:" in the header is followed by "image/tiff", which indicates that the data is image data If the data is character code data, "text/plain" is written. Furthermore in the header, "test" following "Subject:" indicates that the purpose of transmission is to test the transmission.

In the receiver information, "Kato@nnn.cojp" written between the brackets <> following "To:" indicates the receiver's name. In the sender information, "Suzuki@mmm.co.jp" following "From:" indicates the sender's name.

As shown in FIG. 4B, the EEPROM 14 stores in a re-writable manner a character code string corresponding to the character string of "Suzuki" as a print execution character code. This means that if the name of the sender of an e-mail is Suzuki, printing of the e-mail is executed. It is also possible to set a plurality of print execution character codes.

As shown in FIG. 3, the facsimile control circuit 20 is also connected to a network interface card (NIC) 28 for communication of data with another facsimile apparatus 1 and reception of an e-mail from the mail server 49, and the like, and to an NCU 15 that sends dial signals out to the telephone line 52 and answers a call signal from the telephone line 52. The NCU 15 is connected to a modem 16 for transmission and reception of facsimile data Also connected to the facsimile control circuit 20 are a coder 17 that encodes the image data read by the image scanner 19, or the like, for data compression, a decoder 18 that decodes coded data, such as received image data, and the like, and a document sensor 10 that detects a document set on the document setting portion 5. The NIC 28 constitutes a reception device according to the invention.

The printer unit PU has a printer control circuit 27 that controls the ink jet printer 26. The printer control circuit 27 is connected to a CPU 21 that executes programs for controlling the ink jet printer 26. The printer control circuit 27 is also connected to a ROM 22 for storing programs that are executed by the CPU 21, and the like, a RAM 23 including a work memory that is used during operation of the CPU 21, a print memory for storing print data, and the like, a PC interface 24 for connection to the PC 53, a character generator (CG) 25 storing vector fonts of characters and the like for printing, and the ink jet printer 26, which performs printing by ejecting ink droplets onto a print sheet.

In this embodiment, the PC interface 24 is a parallel interface according to the Centronics standards. The facsimile apparatus 1 transmits image data to and receives image data from the PC 53 and receives print data from the PC 53, through the connecting cable 54 connected to the PC interface 24.

Figure 5:
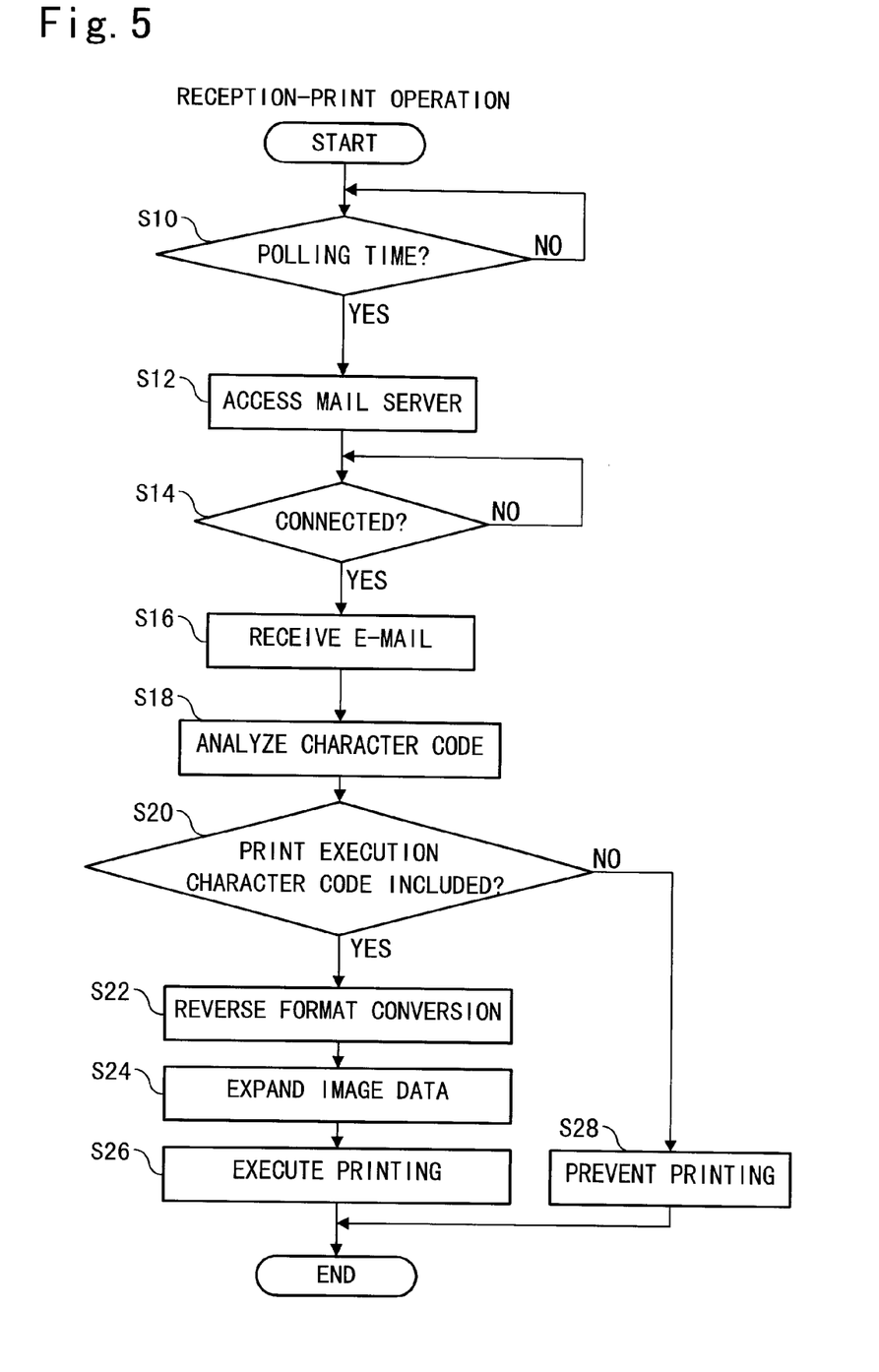
FIG. 5 is a flowchart illustrating a reception-print operation executed by a CPU provided in the facsimile apparatus according to the first embodiment.

The content of a reception-print operation executed by the CPU 11 for the facsimile apparatus 1 to receive an e-mail together with an image file from the sender facsimile apparatus 46 and to print the received image data, will be described with reference to the flowchart of FIG. 5.

In the description below, it is assumed that the header, the sender, and receiver data of an e-mail from the facsimile apparatus 46 are arranged as shown in FIG. 4A. It is also assumed that a character code "Suzuki" is set in the EEPROM 14 as the name of a sender the transmission from whom is to be printed, as shown in FIG. 4B.

When a polling time comes which is set at intervals of a constant time (for example, 5 minutes) to access the mail server 49 in order to fetch an e-mail (YES in step 10), the CPU 11 accesses the mail server 49 in step 12, and then determines whether the connection to the mail server 49 is established in step 14. After detecting the connection to the mail server 49 (YES in step 14), the CPU 11 receives an e-mail from a storage of the mail server 49 in step 16. The thus-received e-mail is stored into RAM 13.

Subsequently in step 18, the CPU 11 analyzes the character codes constituting the text data that indicates the sender of the received e-mail. In step 20, the CPU 11 determines whether a print execution character code is contained in the text data.

Since the characters "Suzuki" are contained in the text data indicating the sender as shown in FIG. 4A (YES in step 20), operation proceeds to step 22. In step 22, the CPU 11 reads the e-mail from the RAM 13, and performs the reverse format conversion of the image data attached to the e-mail, thereby converting into the facsimile format The converted image data is then expanded by the decoder 18 in step 24. The CPU 11 outputs the expanded image data from the facsimile control circuit 20 to the printer control circuit 27, via the interface 30. The CPU 11 causes the CPU 21 to print out the image data in step 26.

Therefore, the CPU 21 drives the ink jet printer 26 to print out the image data on a print sheet.

If it is determined in step 20 that the print execution character code (for example, "Suzuki") is not contained in the sender information (NO in step 20), the CPU 11 prevents image data from being read from the RAM 13 in step 28. That is, the CPU 11 prevents printing in step 28.

In this manner, the facsimile apparatus 1 of this embodiment is able to print received e-mail only when the sender information of the e-mail contains a print execution character code ("Suzuki" in the above description).

In other words, the facsimile apparatus 1 prevents the printing of e-mails from senders that the user does not desire to be printed, that is, e-mails from senders other than Suzuki in the above description. Therefore, the facsimile apparatus 1 reduces the amounts of print sheets and ink that are unnecessarily consumed by the ink jet printer 26.

Although the foregoing embodiment prints a received e-mail if the name of the sender of the e-mail conforms to the name of a sender pre-set as a desired sender, it is also possible to prevent the printing of a received e-mail if the name of the sender of the e-mail conforms to the name of a sender pre-set as an undesired sender.

According to the invention, it is also possible to design a facsimile apparatus so as to execute or prevent the printing of a received e-mail if the purpose of the e-mail is a predetermined purpose.

Figure 4C:
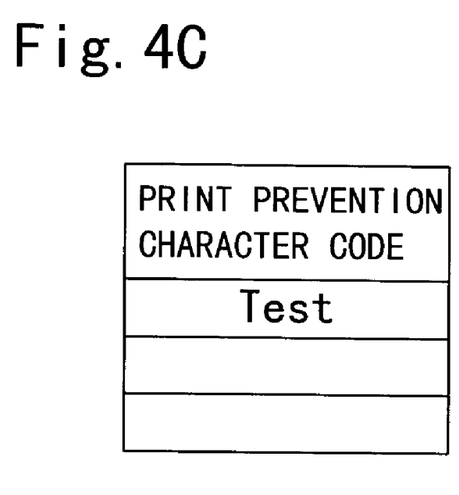
FIG. 4C illustrates a print prevention character code stored in the EEPROM.

For example, as shown in FIG. 4C, which illustrates a portion of the content stored in the EEPROM 14, a character code string "test" is pre-stored into the EEPROM 14 as a print prevention character code. For this design, the flowchart of FIG. 5 is modified by changing the operation of step 20 to an operation of determining whether a print prevention character code is contained, and by switching the affirmative and negative paths from step 20. As a result, if the CPU 11 detects "test" following "Subject:" in the header of a received e-mail (YES in step 20), the CPU 11 prevents the printing of the e-mail in step 28.

A second embodiment of the facsimile apparatus of the invention will be described with reference to FIGS. 6 and 7.

The second embodiment is characterized mainly by being able to transfer a received e-mail.

Figure 6:
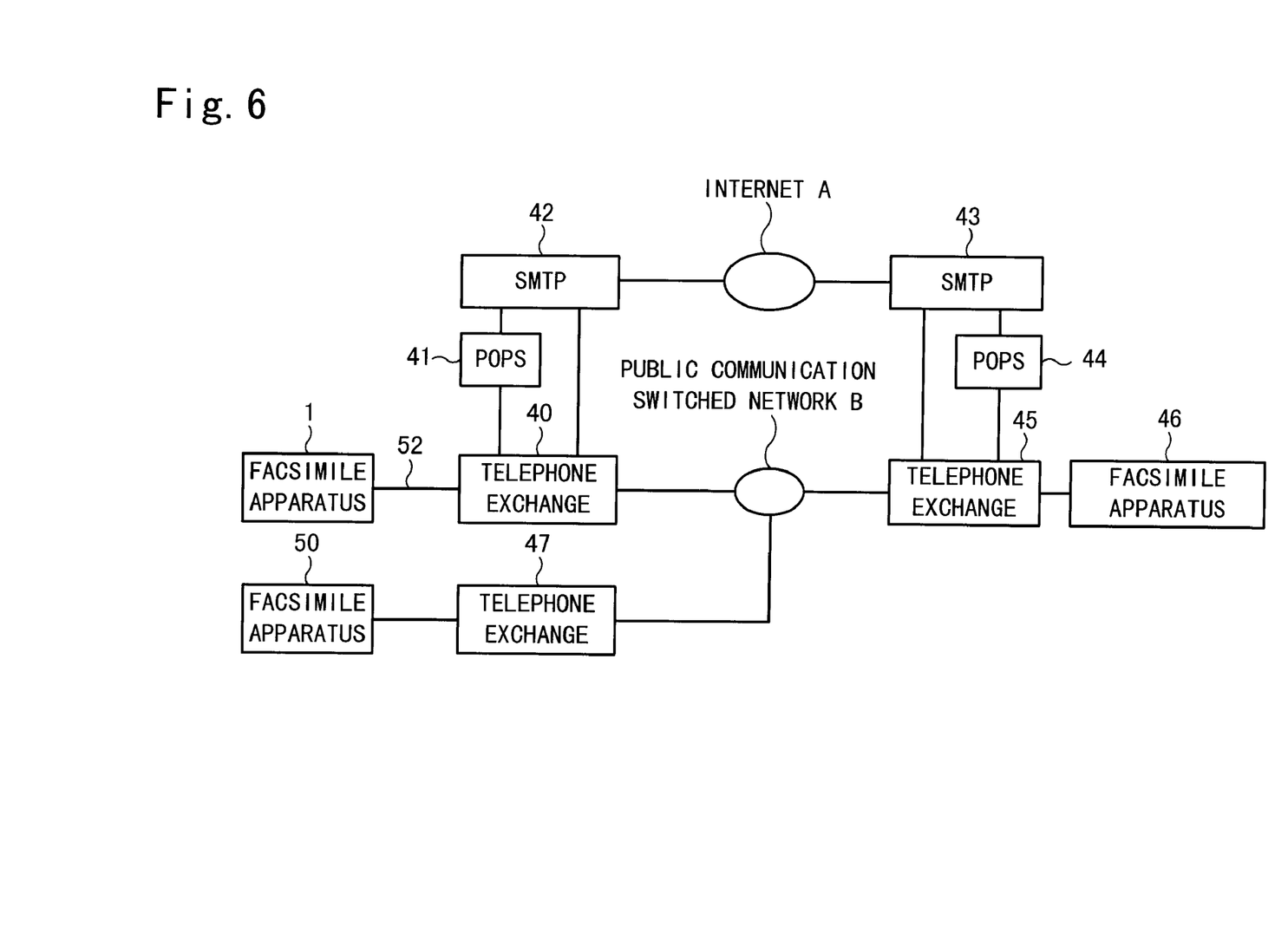
FIG. 6 is a block diagram illustrating the communication lines to which a facsimile apparatus according to a second preferred embodiment of the invention is connected.

FIG. 6 illustrates the structure of communication lines to which a facsimile apparatus of the second embodiment is connected. FIG. 7 is a flowchart illustrating a reception-print operation executed by a CPU provided in the facsimile apparatus of the second embodiment.

For the e-mail transfer function, it is necessary to set a transfer mode by operating keys of the operating panel 3. Therefore, it is assumed in the description below that the transfer mode has been set, and that the forwarding facsimile number for transfer is prestored in a predetermined area in the EEPROM 14 or the RAM 13. The structure of the facsimile apparatus of the second embodiment is substantially the same as that of the facsimile apparatus of the first embodiment, except a portion of the operation executed by the CPU. Therefore, the structure of the facsimile apparatus will not be described again. Furthermore, the process of steps 10 through 18 in FIG. 7 is the same as the process of steps 10 through 18 in FIG. 5, and will not be described again.

Referring to FIG. 6, a facsimile apparatus 50 on the transfer receiver side is connected to the public communication switched network B via a telephone exchange 47.

Figure 7:
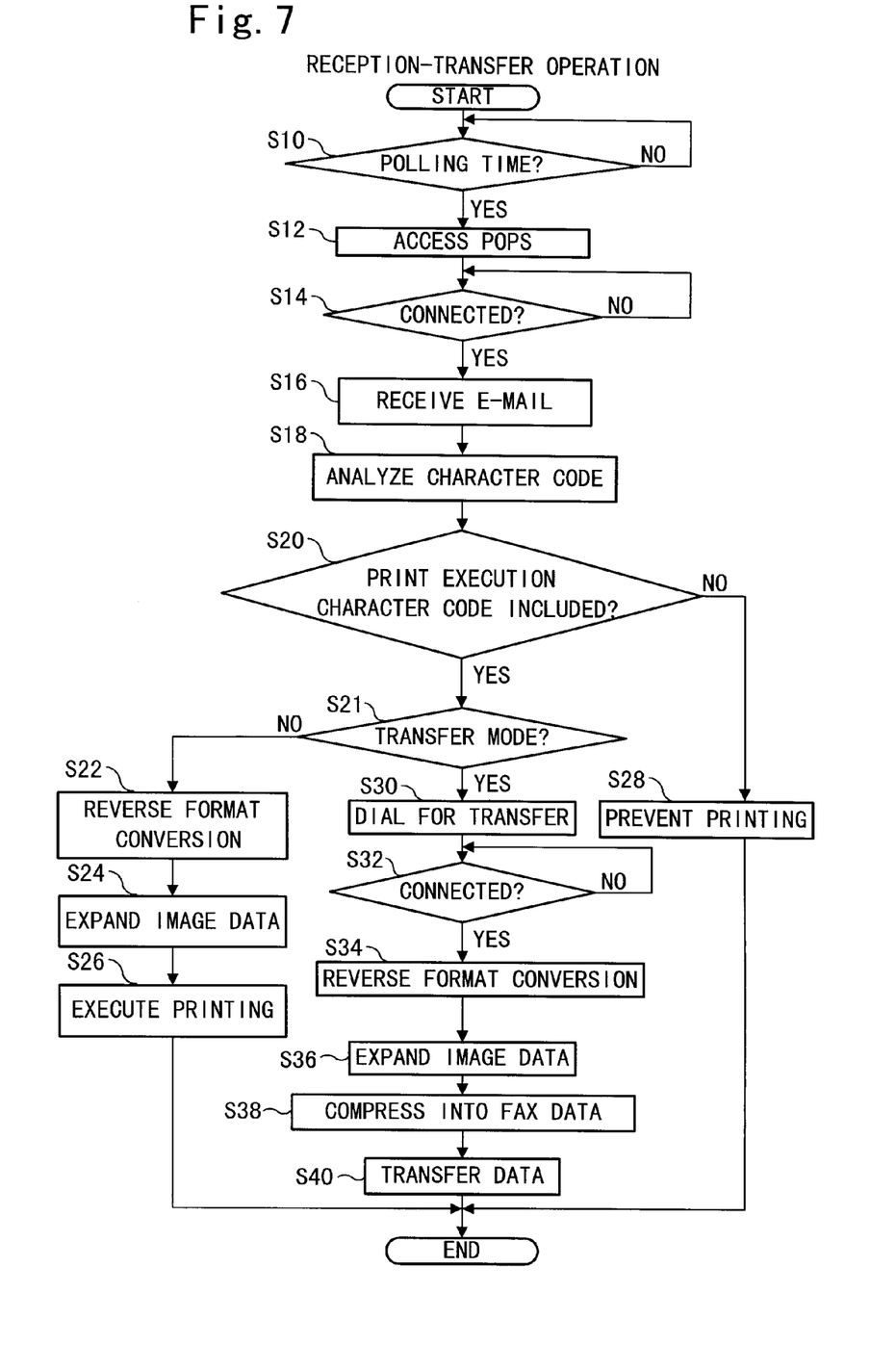
FIG. 7 is a flowchart illustrating a reception-transfer operation executed by a CPU provided in the facsimile apparatus according to the second embodiment.

Referring to the flowchart of FIG. 7, if the CPU 1 1 determines in step 20 that a print execution character code is contained (YES in step 20), the CPU 11 determines in step 21 whether the transfer mode has been set. Since the transfer mode has been set (YES in step 21) as mentioned above, the CPU 11 dials the facsimile apparatus 50 on the transfer receiver side in step 30. Subsequently in step 32, the CPU 11 determines whether the connection to the facsimile apparatus 50 is established. After detecting the connection to the facsimile apparatus 50 (YES in step 32), the CPU 11 reads the image data from the RAM 13 and performs the reverse format conversion of the image data in step 34, and expands the image data in step 36. The CPU 11 then compresses the expanded image data into facsimile data in step 38, and transfers the facsimile data to the facsimile apparatus 50 in step 40.

If it is determined in step 21 that the transfer mode has not been set (NO in step 21), the CPU 11 performs the reverse format conversion of the image data in step 22, expands the image data in step 24, and prints out the expanded image data in step 26.

In this manner, the facsimile apparatus 1 of the second embodiment can automatically transfer a received e-mail to the facsimile apparatus 50.

In other words, an e-mail transmitted to the facsimile apparatus 1 can be transferred to and printed out by the facsimile apparatus 50. Therefore, if a person supposed to receive an e-mail transmitted to the facsimile apparatus 1 is away from the facsimile apparatus 1 but near the facsimile apparatus 50, it is possible for the person to see the content of the e-mail at the facsimile apparatus 50.

According to the invention, the operation executed in step 20 by the CPU 11 serves as a determination device, and the operation in step 26 serves as a print execution device, and the operation in step 28 serves as a print prevention device.

Although the foregoing embodiment executes or prevents the printing of an e-mail if the name of the sender or the purpose of transmission of the e-mail conforms to the data preset in the receiver facsimile apparatus, it is also possible to design a facsimile apparatus so as to execute or prevent the printing of an e-mail on the basis of the determination as to whether the data attached to the e-mail is image data or text data. The determination can be made on the basis of whether the data following the "Content-Type:" as shown in FIG. 4A is "image/tiff" of "text/plain".

If an e-mail contains a mailing list, it is also possible to design a facsimile apparatus so as to execute or prevent the printing of the e-mail on the basis of the determination as to whether the list includes a predetermined list name.

That is, the data that is referred to for the determination as to whether to execute or prevent the printing of received image data, is not limited to the aforementioned kind of data, but may be any data contained in an e-mail.

Although in the foregoing embodiment, the invention is applied to a facsimile apparatus having an e-mail transmitting function, it is also possible to apply the invention to other types of facsimile apparatuses, such as a facsimile apparatus not having an e-mail transmitting function.

As is apparent from the above description, if the determination device of the facsimile apparatus of the invention determines that the related information received together with image information includes predetermined information, the print prevention device prevents the printing of the image information onto a print medium. Therefore, if the image information transmitted from a certain sender is not desired to be printed, the printing of the image information from the sender can be prevented by presetting information that is assumed to be inevitably contained in the related information transmitted from the sender together with the image information, as the aforementioned predetermined information. Thus, the invention realizes a facsimile apparatus capable of distinguishing image information that is not desired to be printed, and preventing the printing thereof.

Furthermore, according to the invention, if the determination device of the invention determines that the related information received together with image information includes predetermined information, the print execution device executes the printing of the image information onto a print medium. Therefore, if the image information transmitted from a certain sender is desired to be printed, the printing of the image information from the sender can be executed by pre-setting information that is assumed to be inevitably contained in the related information transmitted from the sender together with the image information, as the aforementioned predetermined information. Thus, the invention realizes a facsimile apparatus capable of printing only the image information that is desired to be printed.

The facsimile apparatus according to the invention can also execute or prevent the printing of received image information on the basis of the determination as to whether the related information received together with the image information includes predetermined sender information.

For example, if sender information includes a sender that is sending image information that Fe user desires to be printed, and this information is designated beforehand as the aforementioned predetermined sender information, reception of related information that includes the designated sender information results in execution of the printing of the corresponding image information. The opposite manner of print control is also possible. That is, if sender information includes a sender that is sending image information that the user does not desire to be printed, and this information is designated beforehand as the aforementioned predetermined sender information, the image information from the sender will be prevented from being printed.

The facsimile apparatus can also prevent or execute the printing of image information on the basis of the determination as to whether the related information received together with the image information includes predetermined transmission purpose information.

For example, if transmission purpose information corresponding to the image information that is desired to be printed is designated beforehand as the aforementioned predetermined transmission purpose information, the facsimile apparatus executes the printing of image information that is received together with related information that includes the designated transmission purpose information. The opposite manner of print control is also possible for the transmission purpose information corresponding to the image information that is not desired to be printed The facsimile apparatus can also determine whether the related information received together with image information includes predetermined information by determining whether the text data of the related information contains a predetermined character code. Based on the determination made in this manner, the facsimile apparatus prevents or executes the printing of the image information.

With the e-mail transmitting function, the facsimile apparatus can also print only e-mail that is desired to be printed.

It is to be understood that the invention is not restricted to the particular forms shown in the foregoing embodiments. Various modifications and alterations can be made thereto without departing from the scope of the invention.

What is claimed is:

1. A facsimile apparatus comprising:
   a reception device that receives image information and information related to the image information, from an external communication device via a communication line wherein the related information includes text data formed by a plurality of character codes, the related information being unrelated to identification of the external communication device;
   a print device that prints at least the image information received by the reception device, onto a print medium;
   a determination device that determines whether the related information received by the reception device includes predetermined information by determining whether a predetermined character code is present in the text data; and
   a print prevention device that prevents printing from being performed by the print device if the determination device determines that the related information received by the reception device includes the predetermined information.

2. The facsimile apparatus according to claim 1, wherein the determination device determines whether the related information received by the reception device includes the predetermined sender information that indicates a sender of the image information.

3. The facsimile apparatus according to claim 1, wherein the determination device determines whether the related information received by the reception device includes predetermined transmission purpose information that indicates a purpose of transmission of the image information.

4. The facsimile apparatus according to claim 1, wherein the image information is in an image file format and attached to an e-mail.

5. The facsimile apparatus according to claim 4, wherein the reception device is capable of receiving the image information and the related information via an Internet.

6. The facsimile apparatus according to claim 1, wherein the related information is received by the external communication device prior to reception of the image information.

7. A facsimile apparatus comprising:
   a reception device that receives image information and unenciphered information related to the image information, from an external communication device via a communication line wherein the related information includes text data formed by a plurality of character codes, the related information being unrelated to identification of the external communication device;
   a print device that prints at least the image information of the image information and the related unenciphered information received by the reception device, onto a print medium;
   a determination device that determines whether the related unenciphered information received by the reception device includes predetermined information by determining whether a predetermined character code is present in the text data; and a print execution device that executes printing by the print device if the determination device determines that the related unenciphered information received by the reception device includes the predetermined information.

8. The facsimile apparatus according to claim 7, wherein the determination device determines whether the related information received by the reception device includes predetermined sender information that indicates a sender of the image data.

9. The facsimile apparatus according to claim 7, wherein the determination device determines whether the related information received by the reception device includes predetermined transmission purpose information that indicates a purpose of transmission of the image information.

10. The facsimile apparatus according to claim 7, wherein the image information is in an image file format and attached to an e-mail, and the reception device is capable of receiving the image information and the related information via an Internet.

11. The facsimile apparatus according to claim 7, wherein the related information is received from the external communication device prior to reception of the image information.

12. A method of operating a facsimile apparatus comprising:

receiving image information and information related to the image information, from an external communication device via a communication line wherein the related information includes text data formed by a plurality of character codes, the related information being unrelated to identification of the external communication device;

printing at least the received image information onto a print medium;

determining whether the received related information includes predetermined information by determining whether a predetermined character code is present in the text data; and preventing printing if it is determined that the received related information includes the predetermined information.

13. The method according to claim 12, wherein the determination step determines whether the received related information includes predetermined sender information that indicates a sender of the image information.

14. The method according to claim 12, wherein the determination step determines whether the received related information includes predetermined transmission purpose information that indicates a purpose of transmission of the image information.

15. The method according to claim 12, wherein the image information is in an image file format and attached to an e-mail.

16. The method according to claim 15, wherein the image information and the related information are capable of being received via an Internet.

17. The method according to claim 12, wherein the related information is received from the external communication device prior to reception of the image information.

* * * * *